United States Patent Office 3,367,955
Patented Feb. 6, 1968

3,367,955
1,1-DIALKYL-3,3,5,5,7,7-CYCLOTETRASILOXANE
Howard A. Vaughn, Jr., Scotia, N.Y., assignor to General Electric Company, a corporation of New York
No Drawing. Continuation-in-part of application Ser. No. 160,267, Dec. 18, 1961. This application Nov. 27, 1962, Ser. No. 240,441
4 Claims. (Cl. 260—448.2)

This application is a continuation-in-part of my application Ser. No. 160,267 filed Dec. 18, 1961, now abandoned, and assigned to the same assignee as the present invention.

This invention relates to cyclic polydiorganosiloxanes of high phenyl content. More particularly, this invention relates to 1-methyl-1-alkyl-3,3,5,5,7,7-hexaphenylcyclotrisiloxanes having the formula:

(1) 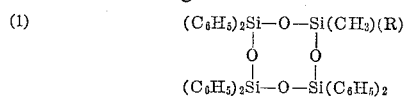

where R is a lower alkyl radical selected from the class consisting of methyl, ethyl, and propyl.

Many cyclic polydiorganosiloxanes are known in the art. These materials are useful in the preparation of high molecular weight linear organopolysiloxanes. Generally these high molecular weight organopolysiloxanes are prepared by reacting the cyclic polydiorganosiloxanes in the presence of an alkaline organopolysiloxane rearrangement and condensation catalyst, such as potassium hydroxide, to form materials of as high molecular weight as desired, including materials having molecular weights in the range of from ten thousand to ten million or more. These high molecular weight materials are generally gums which can be converted to the solid, cured, elastic state.

Among the cyclic polydiorganosiloxanes known in the art are hexaphenylcyclotrisiloxane and octaphenylcyclotetrasiloxane, both of which in theory would be desirable starting materials for the preparation of high molecular weight phenyl-containing organopolysiloxane gums. However, polysiloxanes which contain two phenyl groups on each silicon atom are hard, intractable materials which are not readily convertible to silicone rubbers.

The present invention is based on my discovery of the 1-methyl-1-alkyl-3,3,5,5,7,7-hexaphenylcyclotetrasiloxanes within the scope of Formula 1 which contain a very high percentage of silicon-bonded phenyl groups, but which nevertheless can be treated with conventional organopolysiloxane rearrangement and condensation catalyst to form very high molecular weight polydiorganosiloxanes having a high and controlled amount of silicon-bonded phenyl groups and being ordered in that each fourth silicon atom contains 2 alkyl radicals, one of which is methyl and the other of which can be methyl, ethyl, or propyl. This high molecular weight, this high phenyl content and this order permit the formation of extremely tough organopolysiloxane gums which can be converted into silicone rubbers of outstanding physical properties. These properties are useful in applications where the thermal stability and resistance to electron and pile irradiation provided by the phenyl group is of value. Certain of these polymers are described and claimed in my joint copending application with John F. Brown, Jr., and Christian R. Sporck, Serial No. 160,266, filed Dec. 18, 1961, now abandoned, and in my joint copending application with John F. Brown, Jr., and Christian R. Sporck, Ser. No. 240,436, now Patent No. 3,305,524, filed concurrently herewith, both assigned to the same assignee as the present invention.

The cyclotetrasiloxanes within the scope of Formula 1 include 1,1-dimethyl-3,3,5,5,7,7-hexaphenylcyclotetrasiloxane; 1-methyl-1-ethyl-3,3,5,5,7,7-hexaphenylcyclotetrasiloxane and 1-methyl-1-propyl-3,3,5,5,7,7-hexaphenylcyclotetrasiloxane, where the propyl group can be n-propyl or isopropyl.

The cyclotetrasiloxanes of the present invention can be prepared by several methods. In one method, a methylalkyldichlorosilane having the formula:

(2) 

where R is as previously defined, and diphenyldichlorosilane are heated in the presence of methanol at the reflux temperature of the reaction mixture to form a mixture of methylchloride and cyclopolysiloxanes containing intercondensed methylalkylsiloxane units and diphenylsiloxane units. The desired cycloterasiloxane within the scope of Formula 1 is isolated from this mixture of cyclopolysiloxanes by conventional techniques. In the preparation of the desired cyclotetrasiloxanes within the scope of Formula 1 by this process, the ratio of methylalkyldichlorosilane to diphenyldichlorosilane can vary within fairly wide limits since the reaction results in a mixture of various cyclotetrasiloxanes regardless of the proportions of ingredients. However, for best yields of the desired cyclotetrasiloxanes, three moles of diphenyldichlorosilane should be employed for each mole of the methylalkyldichlorosilane. Satisfactory yields are obtained with from about 1 to 6 moles of diphenyldichlorosilane per mole of methylalkyldichlorosilane. Since one mole of methanol reacts with one mole of silicon-bonded chlorine, it is preferred to have at least this amount of methanol present in the reaction mixture. For example, satisfactory results are obtained when the methanol is employed in the range of from about 1.5 to 30 moles methanol per mole of silicon-bonded chlorine atoms in the diphenyldichlorosilane and methylalkyldichlorosilane. In order to insure completion of the reaction, the reaction mixture is heated at reflux temperature for a time which varies from about 4 hours to about 24 hours or more.

In the second and preferred method of preparing the cyclotetrasiloxanes within the scope of Formula 1, hexaphenyltrisiloxanediol-1,5 is reacted with a methylalkyldichlorosilane within the scope of Formula 2 in the presence of a hydrogen chloride acceptor such as pyridine. Generally the reaction is carried out in the presence of a solvent such as diethyl ether, benzene or toluene to facilitate the reaction. When preparing the cyclotetrasiloxane by this method, it is preferred to employ the reactants in the ratio of 1 mole of the hexaphenyldisiloxanediol, 1 mole of the methylalkyldichlorosilane, and 2 moles of pyridine, with the solvent such as diethyl ether being present in an amount equal to from 2 to 20 times the weight of the other components of the reaction mixture.

While the preferred molar ratio of reactants is as stated above, this ratio can vary within reasonable limits. For example, the methylalkyldichlorosilane can be employed in an amount equal to from about 0.2 to 5 moles per mole of the hexaphenyltrisiloxanediol and the pyridine can be present in amounts up to a tenfold excess. This is equivalent to from 2 to 20 moles of pyridine per mole of whichever of the other two reactants is present in the smaller molar quantity. For example, when the reaction mixture involves 1 mole of dimethyldichlorosilane and 2 moles of hexaphenyltrisiloxanediol-1,5, the pyridine would be present in the amount of from 2 to 20 moles.

The reaction is effected by merely mixing the reactants at room temperature and allowing them to stand for a period of from 2 to 24 hours or more, during which time pyridine hydrochloride appears as a precipitate. The pyridine hydrochloride and the desired cyclotetrasiloxane within the scope of Formula 1 are then isolated from each other and from the reaction mixture by conventional techniques.

Polymers are prepared from the 1-methyl-1-alkyl-3,3,5,5,7,7-hexaphenylcyclotetrasiloxane by conventional techniques such as, for example, heating the cyclotetrasiloxane to a temperature of above its melting point, e.g., from about 115 to 150° C., adding from 10 to 100 parts of potassium hydroxide per million parts of the cyclotetrasiloxane and maintaining the reaction mixture at an elevated temperature until the desired degree of polymerization is obtained.

The following examples are illustrative of the practice of my invention, and are not intended for purposes of limitation. All parts are by weight.

*Example 1*

Over a period of about 1 hour, a mixture of 32.0 parts dimethyldichlorosilane and 190.0 parts diphenyldichlorosilane was added to a reaction vessel containing about 210 parts methanol. The reaction mixture was then heated at reflux (about 65° C.) for about 8 hours. Upon cooling of the reaction mixture, a lower oily layer and an upper methanol layer were formed. The lower layer was separated and fractionally distilled and a fraction was collected at a vapor temperature of 286 to 300° C. at 0.6 millimeter and a pot temperature of about 310° C. Upon storage of this distillate at room temperature, crystals appeared which were twice recrystallized from a solution of 28% by weight benzene in ethanol and twice recrystallized from isopropanol, yielding purified 1,1-dimethyl-3,3,5,5,7,7-hexaphenylcyclotetrasiloxane, which had a melting point of about 116° C. This material had the formula:

(3) 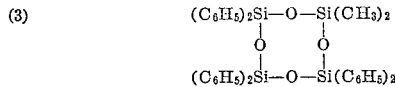

The identity of this material was confirmed by infrared analysis which showed a doublet at 8.9 microns and a peak at 13.9 microns corresponding to the diphenylsiloxy unit, a peak at 9.3 microns corresponding to the cyclotetrasiloxane ring and a high intensity peak at 11.8 microns corresponding to the isolated dimethylsiloxy unit. The relative intensities of the peaks corresponding to the dimethylsiloxane units and the diphenylsiloxane units as compared with standards indicated that the product contained 75 mole percent diphenylsiloxane units and 25 mole percent dimethylsiloxane units.

*Example 2*

Into a reaction vessel were placed 20.4 parts of hexaphenyltrisiloxanediol-1,5, 175 parts diethyl ether and 4.3 parts dimethyldichlorosilane. To this mixture was added 5.3 parts of pyridine and the reaction mixture was stirred for about 2½ hours at 26 to 28° C., during which time a pyridine hydrochloride precipitate formed. The pyridine hydrochloride was filtered from the reaction mixture and the resulting ether solution was washed twice with water to remove additional pyridine hydrochloride and evaporated, yielding 22.3 parts of a solid residue. This residue was mixed with about 15 parts of hexane, allowed to stand for 16 hours, filtered, and the residue was washed with hexane at room temperature. The residue was then washed with methanol and recrystallized from a mixture of equal parts of benzene and hexane to yield 12.6 parts of 1,1 - dimethyl-3,3,5,5,7,7-hexaphenylcyclotetrasiloxane which had a melting point of 115 to 116° C. The infrared curve of this product was identical to that of the product of Example 1. Six parts of this material were mixed with 0.05 part of a 1.0 percent by weight potassium hydroxide dispersion in octamethylcyclotetrasiloxane and the reaction vessel was connected to a vacuum pump. When the pressure in the system became steady at $10^{-4}$ mm., the reaction mixture was heated to 125° C. for one hour. At the end of this time the reaction mixture had been converted to a clear, tough, resilient polymer having an intrinsic viscosity of 1.50 deciliters per gram when measured in toluene at 30° C. The infrared analysis of this material was substantially identical to that of the cyclotetrasiloxane of Example 1 except that the bands corresponding to the cyclotetrasiloxane ring were no longer present. This polymer consisted essentially of the following recurring units:

(4) $-(C_6H_5)_2SiO(C_6H_5)_2SiO(C_6H_5)_2SiO(CH_3)_2SiO-$

Chemical analysis of the polymer showed the presence of 67.9 percent carbon and 5.6 percent hydrogen as compared with the theoretical values of 68.4 percent carbon and 5.4 percent hydrogen. This polymer was converted to a silicone rubber having a tensile strength in excess of 2000 p.s.i. and an elongation in excess of 400% by irradiating the polymer with 800,000 kilovolt peak electrons to a dose of $100 \times 10^6$ roentgens.

*Example 3*

Into a reaction vessel was placed a solution of 64 parts pyridine in 70 parts benzene. Over a one hour period, a solution of 122.4 parts hexaphenyltrisiloxanediol-1,5 in 200 parts benzene and a solution of 28.6 parts methylethyldichlorosilane in 200 parts benzene were slowly added. The resulting mixture was stirred for an additional hour and the pyridine hydrochloride precipitate was filtered from the reaction mixture, resulting in a benzene solution of product. This solution was washed with water to remove any remaining pyridine hydrochloride and the benzene was evaporated to yield a solid material which was recrystallized from a mixture of equal volumes of toluene and isopropanol to yield 95.8 parts of 1-methyl-1-ethyl-3,3,5,5,7,7-hexaphenyl-cyclotetrasiloxane having the formula:

(5) 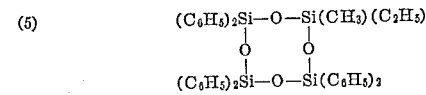

This material was a white crystalline solid having a melting point of from 90 to 91° C. Infrared analysis of this material showed the presence of the cyclotetrasiloxane ring, the diphenylsiloxane units and the methylethyl-siloxane unit. Ten parts of this material were mixed with 0.1 part of a 1% by weight potassium hydroxide dispersion in octamethylcyclotetrasiloxane in a recation vessel which was evacuated to a pressure of 15 microns. The reaction mixture was then heated to 140° C. and at the end of two hours the reaction mixture had been converted to a clear, tough, resilient polymer having an intrinsic viscosity of 0.70 deciliters per gram when measured in toluene at 30° C. This material consisted of recurring structural units having the formula:

(6) 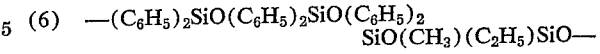

This polymer was converted to a silicone rubber having a tensile strength in excess of 1500 p.s.i. and an elongation in excess of 300% by irradiating the polymer with high energy electrons to a dose of $100 \times 10^6$ roentgens.

*Example 4*

To a reaction vessel was added a solution of 64 parts pyridine in 700 parts benzene. Over a one hour period there were simultaneously added to the reaction vessel a solution of 122.4 parts hexaphenyltrisiloxanediol-1,5 in 200 parts benzene and a solution of 31.4 parts methyl-n-propyldichlorosilane in 200 parts benzene. The reaction mixture was stirred during this addition and for one additional hour. At the end of ths time the pyridine hydrochloride precipitate was filtered from the reaction mixture and the reaction mixture was washed with water to remove any additional pyridine hydrochloride. The benzene was then stripped from the reaction mixture yielding a solid material which was recrystallized from an equal volume mixture of toluene and isopropanol to produce 95.4 parts of 1-methyl-1-n-propyl-3,3,5,5,7,7-hexaphenyl cyclotetrasiloxane having the formula:

(7) 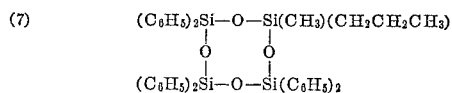

This material was a white crystalline solid having a melting point of from 87 to 88.2° C. Its identity was confirmed by infrared analysis which showed the presence of the cyclotetrasiloxane ring, the diphenylsiloxane units and the methylpropylsiloxane units. Ten parts of this material were mixed with 0.1 part of a 1% dispersion of potassium hydroxide in octamethylcyclotetrasiloxane in a recation vessel which was evacuated to a pressure of 30 microns. The reaction vessel was then heated to a temperature of 145° C. and at the end of about two hours the crystalline material had been converted to a high molecular weight gum having an intrinsic viscosity of 0.60 deciliters per gram when measured in toluene at 30° C. This gum consisted essentially of the recurring units having the formula:

(8) 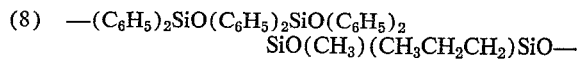

This gum was converted to a silicone rubber having a tensile strength greater than 1000 p.s.i. and an elongation in excess of 300% irradiation of the gum with high energy electrons to a dose of 100×10⁶ roentgens.

What I claim as new and desire to secure by Letters Patent of the United States is:

1. A 1-methyl-1-alkyl-3,3,5,5,7,7-hexaphenylcyclotetrasiloxane having the formula:

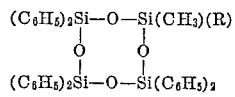

where R is an alkyl radical selected from the class consisting of methyl, ethyl and propyl.

2. The compound 1,1-dimethyl-3,3,5,5,7,7-hexaphenyl-cyclotetrasiloxane having the formula:

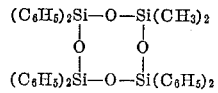

3. The compound 1-methyl-1-ethyl-3,3,5,5,7,7 - hexaphenylcyclotetrasiloxane having the formula:

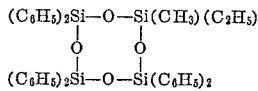

4. The compound 1-methyl-1-n-proply-3,3,5,5,7,7-hexaphenylcyclotetrasiloxane having the formula:

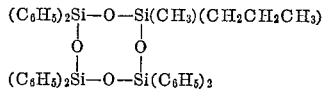

References Cited

UNITED STATES PATENTS

| | | | |
|---|---|---|---|
| 2,483,158 | 9/1949 | Sprung et al. | 260—448.2 |
| 2,605,274 | 7/1952 | Tyler | 260—448.2 |
| 2,860,152 | 11/1958 | Fletcher | 260—448.2 |

OTHER REFERENCES

Eaborn, C., Organosilicon Compounds, New York, Academic Press, 1960, pp. 246–249.

HELEN M. McCARTHY, *Primary Examiner.*

TOBIAS E. LEVOW, SAMUEL H. BLECH,
*Examiners.*

J. G. LEVITT, P. F. SHAVER, *Assistant Examiners.*